(12) United States Patent
Kaufmann et al.

(10) Patent No.: US 9,205,358 B2
(45) Date of Patent: Dec. 8, 2015

(54) FILTER ELEMENT

(71) Applicant: MANN+HUMMEL GMBH, Ludwigsburg (DE)

(72) Inventors: Michael Kaufmann, Meckenheim (DE); Klaus-Dieter Ruhland, Meckenheim (DE); Friedrich Kupfer, Poxau (DE); Joachim-Paul Krieger, Reisbach (DE); Anita Moosmueller, Ganghofen (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/178,421

(22) Filed: Feb. 12, 2014

(65) Prior Publication Data

US 2014/0224129 A1    Aug. 14, 2014

Related U.S. Application Data

(60) Provisional application No. 61/815,214, filed on Apr. 23, 2013.

(30) Foreign Application Priority Data

| Feb. 12, 2013 | (DE) | .......................... 10 2013 002 274 |
| Feb. 12, 2013 | (DE) | .......................... 10 2013 002 275 |
| Feb. 12, 2013 | (DE) | .......................... 10 2013 002 276 |
| Feb. 12, 2013 | (DE) | .......................... 10 2013 002 277 |
| Feb. 12, 2013 | (DE) | .......................... 10 2013 002 278 |

(51) Int. Cl.
*B01D 46/24* (2006.01)
*B01D 46/00* (2006.01)
(Continued)

(52) U.S. Cl.
CPC ........ *B01D 46/0004* (2013.01); *B01D 46/0005* (2013.01); *B01D 46/008* (2013.01); *B01D 46/0041* (2013.01); *B01D 46/2411* (2013.01);
(Continued)

(58) Field of Classification Search
CPC ........... B01D 46/2411; B01D 46/2414; B01D 46/521; B01D 2271/025; B01D 2271/027; B01D 2265/06; F02M 35/02483
See application file for complete search history.

(56) References Cited

U.S. PATENT DOCUMENTS 6,149,700 A * 11/2000 Morgan et al. ............... 55/385.3
2004/0244586 A1 * 12/2004 Schaerlund et al. ............ 95/268
(Continued)

FOREIGN PATENT DOCUMENTS

| DE | 102006036643 A1 | 2/2008 |
| DE | 102010010964 A1 | 9/2011 |
| WO | 2009047196 A1 | 4/2009 |

OTHER PUBLICATIONS

German Office Action of 10 2013 002 276.2 dated Nov. 4, 2013.

*Primary Examiner* — Robert Clemente
(74) *Attorney, Agent, or Firm* — James Hasselbeck

(57) ABSTRACT

A filter element has a filter body with a longitudinal axis, the filter body having a first end face and a second end face opposite the first end face. A first end plate is arranged at the first end face and has an open or closed configuration. A second end plate is arranged at the second end face. A support tube is arranged concentrically to the longitudinal axis and extends between the first and second end plates. The first end plate is reinforced by a reinforcement ring. The reinforcement ring has first openings that are visible from the exterior of the reinforcement ring, wherein the first openings enable a filling level check of a filling level of a material that connects the first end plate with the first end face.

18 Claims, 6 Drawing Sheets

(51) Int. Cl.
*B01D 50/00* (2006.01)
*F02M 35/02* (2006.01)
*F02M 35/022* (2006.01)
*F02M 35/024* (2006.01)
*F02M 35/08* (2006.01)

(52) U.S. Cl.
CPC .......... *B01D 46/2414* (2013.01); *B01D 50/002* (2013.01); *F02M 35/0205* (2013.01); *F02M 35/0214* (2013.01); *F02M 35/0216* (2013.01); *F02M 35/0223* (2013.01); *F02M 35/0245* (2013.01); *F02M 35/02416* (2013.01); *F02M 35/02425* (2013.01); *F02M 35/02483* (2013.01); *F02M 35/08* (2013.01); *B01D 2265/021* (2013.01); *B01D 2265/06* (2013.01)

(56) References Cited

U.S. PATENT DOCUMENTS

| | | | |
|---|---|---|---|
| 2006/0254229 A1 | 11/2006 | Schrage et al. | |
| 2009/0049814 A1* | 2/2009 | Baseotto et al. | 55/482 |
| 2010/0263339 A1* | 10/2010 | Steins et al. | 55/337 |
| 2011/0308212 A1* | 12/2011 | Ruhland et al. | 55/498 |
| 2012/0210683 A1 | 8/2012 | Gillenberg et al. | |
| 2012/0324849 A1 | 12/2012 | Ackermann et al. | |
| 2013/0263744 A1* | 10/2013 | Osendorf et al. | 96/380 |

* cited by examiner

FILTER ELEMENT

CROSS-REFERENCE TO RELATED APPLICATIONS

This application claims the benefit of U.S. Provisional Application No. 61/815,214 filed: Apr. 23, 2013. This application claims foreign priority under 35 USC 119(b) to prior filed German patent applications 10 2013 002 274.6 filed Feb. 12, 2013; 10 2013 002 275.4 filed Feb. 12, 2013; 10 2013 002 277.0 filed Feb. 12, 2013; 10 2013 002 278.9 filed Feb. 12, 2013; and 10 2013 002 276.2 filed Feb. 12, 2013, the entire contents of the aforesaid U.S. Provisional application and the aforesaid German patent applications being incorporated herein by reference.

BACKGROUND OF THE INVENTION

The invention concerns a filter element, in particular for use as an air filter of an internal combustion engine, as well as a filter system for installing such a filter element.

WO 2009/047196 A1 discloses a filter system with a filter element in which, by configuring the seals of the filter element with two annular bead-shaped arrangements and a sealing groove positioned in between, it is ensured that, on the one hand, a sealing action and, on the other hand, an axial support of the filter element in a housing are achieved. Particularly when using a plastic material for sealing vibration-exposed elements, a design is required that reliably works even under extreme temperature fluctuations.

Usually, filter elements of air filters are exchanged after a certain operating time. Depending on the dust load, the service life of an air filter can be a few days (construction machinery) up to several months.

In particular in case of frequent exchange of filter elements, a reliable sealing action of the filter element in a housing is important for reliable operation. The sealing action should be temperature-resistant and vibration-resistant. In facilities or devices that are exposed to strong vibrations or impacts, the sealing action of the filter element must be reliably ensured also. At the same time, the filter element, if possible, should contain no metallic parts so that it can be thermally disposed of without problems.

An object of the invention is to provide a filter element with a reliable sealing action between the area of the unfiltered medium and the area of the filtered medium that, in particular in case of frequent exchange of the filter element, provides a reliable installation.

A further object of the invention is to provide a filter system for receiving such an exchangeable filter element that exhibits a reliable sealing action and a reliable installation.

SUMMARY OF THE INVENTION

In accordance with the present invention, this is achieved in accordance with one aspect of the invention by a filter element in which at least one of the end plates is reinforced with a reinforcement ring which has openings that are visible from the exterior for filling level check of a filling level of a material for connecting the end plate with an end face of the filter body and, according to a further aspect of the invention, this is solved by a filter system with such a filter element.

A filter element is proposed that has a filter body with a longitudinal axis, a first open or closed end plate arranged at an end face and a second end plate at the oppositely positioned end face as well as a support tube arranged about the longitudinal axis an extending between the first and the second end plates. In this connection, at least one of the end plates is reinforced by a reinforcement ring which is provided with openings that are visible from the exterior for filling level check of a filling level of a material for connecting the end plate with an end face of the filter body.

Manufacturing a filter element of the described kind usually entails manufacture of the end plates from, for example, a soft-elastic foam material. In this context, first a filter body and an embedded reinforcement ring, which may be embodied with a closed rim or without a rim, are integrated and subsequently the end plates are connected by foaming an appropriate foam or elastomer material onto the two end faces of the filter body. In this process, the foam rises also within the filter body. In case of a reinforcement ring with a closed circumferential rim, it is possible only by cutting open the reinforcement ring after manufacture of the end plates to determine how high the material or the foam has risen in the filter body, how high it has risen in the external area of the filter body, and how fast (strong) the connection of the end plates with the filter body is.

The arrangement according to the invention enables a continuous and destruction-free check of the filling level of the material which is used as an end plate material as well as for sealing the end plates relative to the filter body. This check is conceivable as a random sample check and enables, in particular as an online check, automation in mass production in a manufacturing facility. Since the foam height can be seen from the exterior, it is possible in a simple way to determine whether the metered quantity of the material for the manufacturing process was sufficient and therefore seal-tightness of the connection of the end plate with the end face of the filter body is reliably ensured.

In a beneficial embodiment, the reinforcement ring can have slits as openings through which the filling level of the foam during or after the manufacturing process can be observed. Accordingly, the manufacturing process itself can be checked or monitored or a quality control at the end of the manufacturing process can be realized. Slots are moreover easily introduced into the reinforcement ring without the stability of the reinforcement ring being compromised too much.

Advantageously, the filling level check of a filling level of a material for connecting the end plate with the end face of the filter body can be done by determining the rise of a foam in the openings visible from the exterior. The rise of the foam provides an easily determined measure for the penetration depth of the material into the filter body and/or for the thickness of the end plate; the rise in turn can be compared to a technical specification.

Beneficially, by means of the openings of the reinforcement ring that are visible from the exterior, a filling level of the material of the end plate can be determined without requiring destructive testing, for example, cutting open the reinforcement ring, and this can be done cost-effectively and/or even online during the manufacturing process.

Expediently, the reinforcement ring can moreover have openings that are visible from the interior for filling level check of a filling level of a material for connecting the end plate with the end face of the filter body. Accordingly, also via the inner side a precise determination in regard to the success of the manufacturing process of end plate and seal-tightness action between end plate and filter body is possible.

In an advantageous embodiment, the reinforcement ring can have curved webs for interlocking of the material of the end plate with the filter body. For a permanent utilization of a filter element in a mechanically greatly loaded system, for example, in motor vehicles, primarily in the filed of construction and agricultural machinery, the permanent and reliably seal-tight connection of the end plates with the filter body are of utmost importance. This can be realized by means of an interlocking action of the material of the end plate with the reinforcement ring of the filter body that is a good as possible. This in turn is favored by a design of the surface of the reinforcement ring with curved webs.

Expediently, the material can be provided for sealing an end face of the filter body. In this way, a reliable function of an air filter is possible that operates without undesirable bypass and thus without additional dirt introduction into the clean air area.

Advantageously, the first end plate can have a radial seal relative to the housing. This has the advantage that, in addition to an excellent sealing action and therefore a reliable filter action, a doubled radial guiding action of the filter element in the housing can be effected by means of the radial seal as well as the radial clamping of the support knobs in the cover and, therefore, a very stable securing action of the filter element in the housing is provided.

In an advantageous configuration, the material for connecting the at least one end plate with the end face of the filter body as well as the material of the at least one end plate can be comprised of polyurethane foam or an elastomer. Of course, there is also the possibility of producing the end plate of several plastic components in order to provide an optimal deformability across a wide temperature range, as it may be encountered in practice. For example, thermoplastic synthetic materials are not excluded. Both end plates can be fused with the filter body or glued thereto in order to effect a stable connection.

In a beneficial configuration, the filter body can be folded in a zigzag shape and annularly closed and can be comprised of a filter medium that is selected from paper, paper reinforced with plastic fibers, and/or plastic-coated paper. The use of these materials as filter medium provides a very economic possibility for realizing such a filter element. At the same time, the described configuration provides a stable arrangement so that a self-supporting construction of the filter body and thus a beneficial mounting property are provided.

Expediently, the filter element can be designed as a compact air filter, in particular as an air filter of an internal combustion engine. The safe operation of internal combustion engines is based also on a safe and beneficial filtering action of the intake air for combustion. The described filter element provides an economic possibility for this purpose.

Advantageous is also the use of the filter element as a particulate filter, in particular as a diesel particulate filter of an internal combustion engine. In this context, reliable installation and economic exchangeability or replacement of the described filter element are also of utmost importance.

According to a further aspect, the invention concerns a filter system with a filter element according to one of the preceding claims. The filter system comprises a housing which is substantially concentrically configured relative to a longitudinal axis; a cover that closes off the housing and that is also concentrically configured relative to the longitudinal axis; an inlet arranged on the housing and/or on the cover for supply of the medium to be filtered, in particular air; wherein on the housing, concentric to the longitudinal axis, an outlet for discharging the filtered medium is provided; wherein on the housing, in the area of the outlet, a sealing contour is provided which corresponds with, or is complementary to, the radial seal of the first end plate of the filter element; wherein the filter element is arranged exchangeably in the housing of the filter system.

The important advantage of such a filter system resides in the safe and stable installation of the filter element as well as in the very economic exchangeability or replacement of the filter element in case of servicing. In particular for a short service life, as is the case in applications in agricultural and construction machinery, a quick exchangeability is of great importance.

Advantageously, in the area of the inlet of the filter system a cyclone separator can be provided and, on the housing or on the cover, a dirt outlet can be provided. This cyclone separator is comprised of a guiding geometry that causes the medium to be filtered to rotate. Due to this rotation the dirt is concentrated in the area of the housing wall and is discharged at a suitable location by means of a dirt outlet. Due to the preseparation of most of the dirt from the air to be filtered, the service life of the actual filter element can be extended decisively.

According to a further configuration of the invention, a secondary element can be arranged in the inner space of the filter element. The secondary element that is comprised of a support structure that is covered with a permeable filter medium, for example, a nonwoven, has the task of keeping closed upon exchange of the filter element the outlet of the filter system so that no dirt can penetrate into this area while the filter element is being cleaned or replaced. The secondary element in a preferred embodiment is connected by a screw connection with the housing and is provided relative to the housing with a seal.

BRIEF DESCRIPTION OF THE DRAWING

Expedient embodiments and advantages of the invention result from the claims, the description, and the drawings. In the drawings exemplary embodiments of the invention are illustrated. The drawings, the description, and the claims contain numerous features in combination. A person of skill in the art will expediently consider the features also individually and will combine them to other meaningful combinations.

In the Figures, same or functionally the same components are identified with same reference characters. The Figures show only examples and are not to be understood as limiting the invention.

DESCRIPTION OF THE PREFERRED EMBODIMENTS

Figure 1:
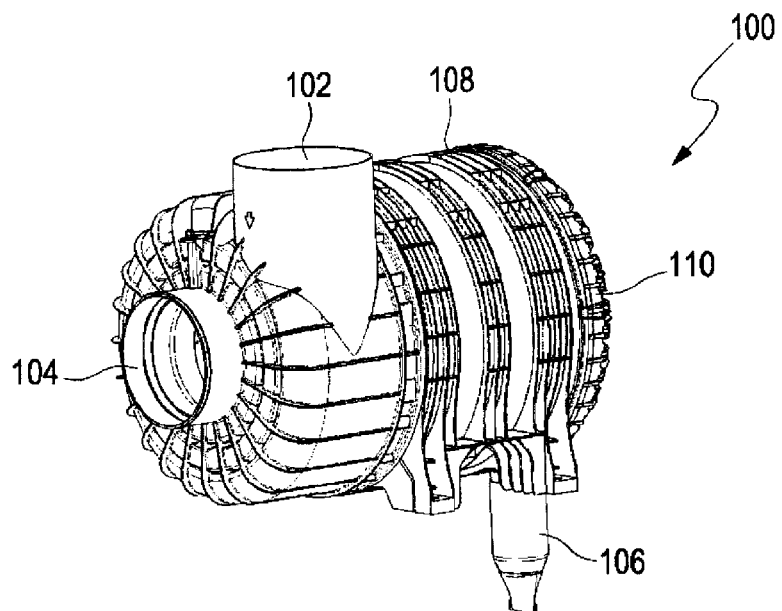
FIG. 1 shows in a perspective view a filter system according to one embodiment of the invention with tangential inlet, central outlet, and dirt outlet at the bottom.

FIG. 1 shows a perspective view of a filter system 100 according to an embodiment of the invention with tangential inlet 102, central outlet 104 at a housing end face, and a dirt outlet 106 at the bottom. Illustrated is a round filter configuration which is comprised of a housing 108 that is closed off by a cover 110, for example, a screw cover or bayonet coupling cover.

When used as an air filter system, dust-laden air flows into the inlet 102 that is arranged tangentially to the air filter element mounted in the interior of the housing so that the air is caused to rotate in the interior of the housing 108 by means of an incoming flow protector at the filter element. Filter element and incoming flow protector are not illustrated in the drawing. The cyclone effect that is caused by the rotational movement of the air causes centrifugal forces to act on the dust particles of the incoming air so that the dust particles are separated partially at the housing wall and can be discharged through the dirt outlet 106 from the filter system 100. In this way, the filter element is loaded less with dust or dirt and the service life of the filter element is increased. The purified air can then be discharged through the central outlet 104 from the housing 108.

Figure 2:
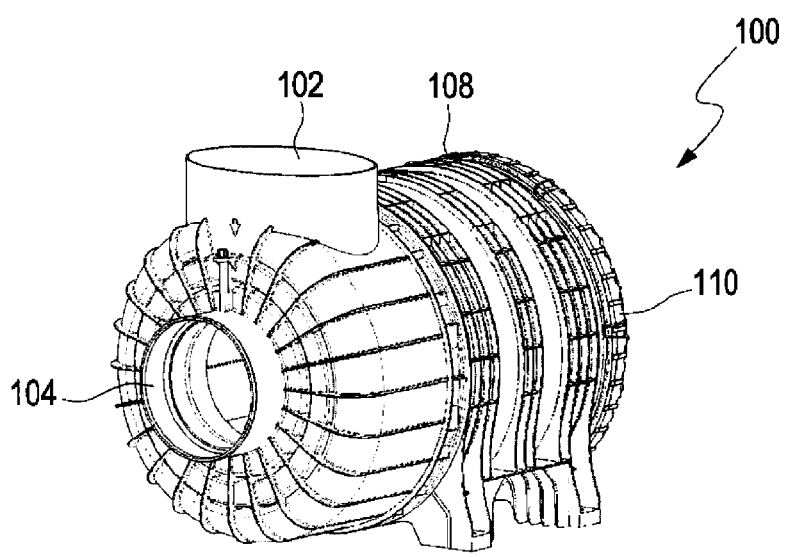
FIG. 2 shows in a perspective view a filter system according to another embodiment of the invention with a radial inlet and a central outlet.

FIG. 2 shows a perspective view of a filter system 100 according to another embodiment with inlet 102 at the cover and the central outlet 104. Illustrated is also a round filter configuration comprised of housing 108 closed off by cover 110. The inlet through which the dust-laden air flows into the housing is in this case centrally arranged above the filter element arranged in the interior of the housing. The outlet 104 through which the purified air can be discharged is also arranged centrally, as is shown also in FIG. 1.

Such filter systems as illustrated in FIGS. 1 and 2 are usually employed in construction machinery and in agricultural machinery. They are characterized by great robustness and have a short service life due to their high filter load. The filter system 100 when the filter element is laden with dust must be able to tolerate a weight increase of 10 kg or more.

Figure 3:
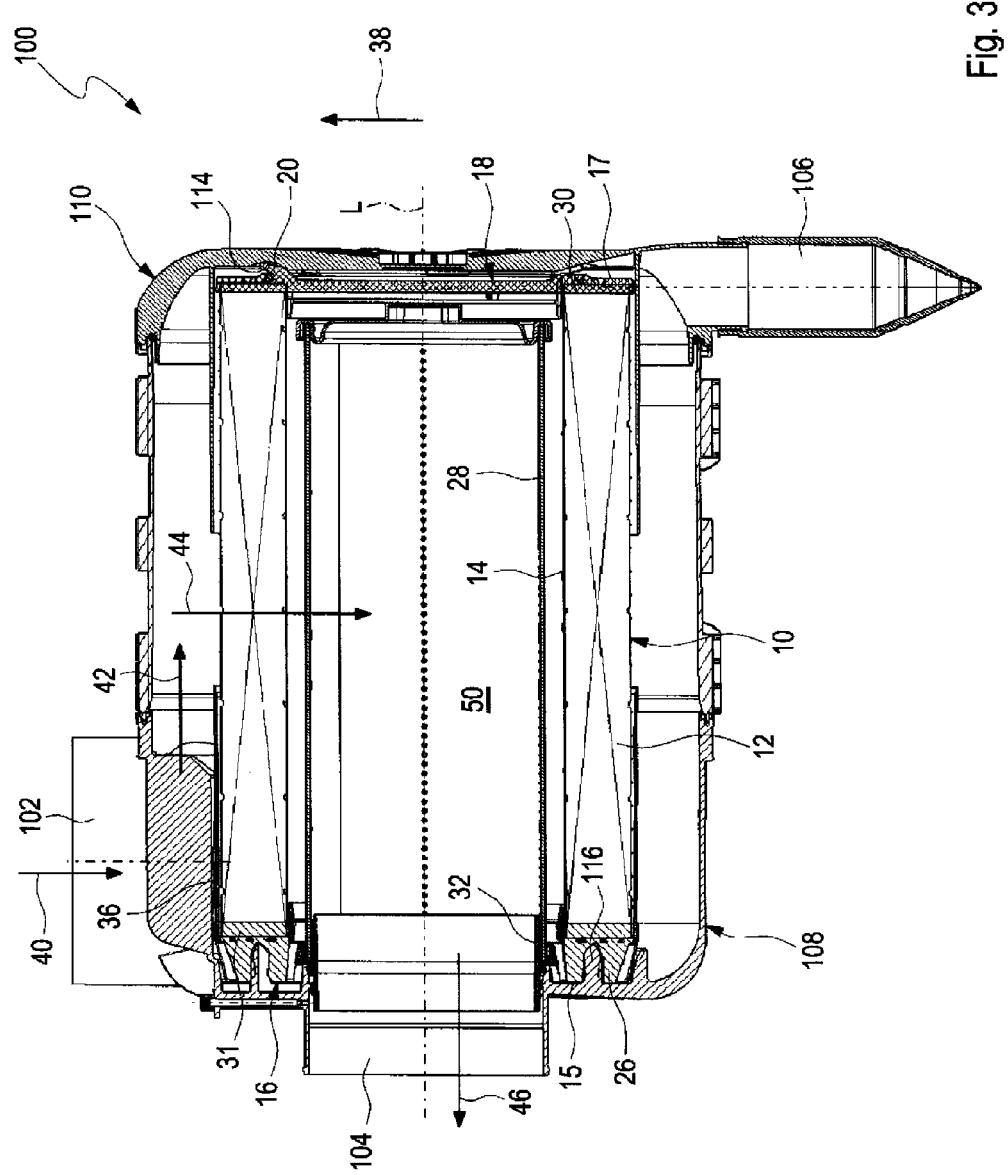
FIG. 3 shows a longitudinal section of the filter system according to the embodiment of FIG. 1 with tangential inlet, central outlet, and dirt outlet at the bottom.

In FIG. 3, a longitudinal section of the filter system 100 according to the embodiment of the invention of FIG. 1 with tangential inlet 102, central outlet 104, and dirt outlet 106 at the bottom is illustrated. The housing 108 of the filter system 100 is closed off with cover 110. The filter element 10 that is comprised of the support tube 14 concentric to the longitudinal axis L and the filter body 12 is closed off at two opposed end faces 15, 17 by a first end plate 16 and a second end plate 18. The end plates 16, 18 can be made, for example, of polyurethane foam or an elastomer. The second end plate 18 and the support tube 14 of the filter element 10 can also be manufactured together as a monolithic part.

The filter body 12 can be folded, for example, in a zigzag shape and annularly closed and can be comprised, for example, of paper, paper reinforced with plastic fibers, and/or plastic-coated paper.

The second end plate 18 whose stability is increased by a reinforcement plate 30 has segment-like interrupted support knobs 20 which extend radially outwardly and are arranged in a circular shape about the longitudinal axis L; when mounted in the housing 108, the knobs 20 come to rest at an inner cover contour 114 of the cover 110 so as to engage in radial direction 38 outwardly and, in this way, they are supported at the housing 108 axially as well as radially. On the opposite end face 15 of the filter element 10, a radial seal 26 is provided on the first end plate 16 whose stability is increased by a reinforcement ring 31. By means of the radial seal 26, the filter element 10 is supported radially via the sealing contour 116 on the housing 108 and seals the unfiltered air chamber relative to the filtered air chamber. The filter element 10 is thereby axially as well as radially twice clamped relative to the housing 108.

Dust laden air can flow in through the inlet 102 in the direction of arrow 40; inlet 102 in this case is designed as a tangential inlet and a cyclone operation is enabled due to the rotational movement of the air, caused by the cyclone separator 36. Dust particles can be partially preseparated and deposited due to the rotational movement on the inner housing wall and, when the filter housing 108 is mounted in horizontal position, can be discharged from the filter system 100 through the dirt outlet 106 in downward direction due to the force of gravity. The air flows in operation after the partial preseparation of the dust particles through the filter body 12 in the direction of arrows 42, 44 into the inner space 50 of the filter element. Dust particles are retained, starting at a certain size depending on the filter medium, within the filter medium. Depending on the dust loading, the filter element 10 must be exchanged thus after a certain operating time.

Through the outlet 104, the filtered air flows out in the direction of arrow 46. In the inner space 50 of the filter element 10, a secondary element 28 is provided which is substantially comprised of a support structure and a relatively permeable filter medium, for example, a nonwoven. When exchanging the filter element 10, the secondary element 28 remains in the housing 108 as a protection of the downstream air guiding manifold, for example, of an internal combustion engine, with respect to penetration of dust particles and other objects. The secondary element 28 is screwed with a screw part 32 fixedly to the outlet end part of the housing 108.

The filter element 10 can be used as a compact air filter, in particular as an air filter of an internal combustion engine. In principle, its use as a diesel particulate filter in a similar configuration is also conceivable.

Figure 4:
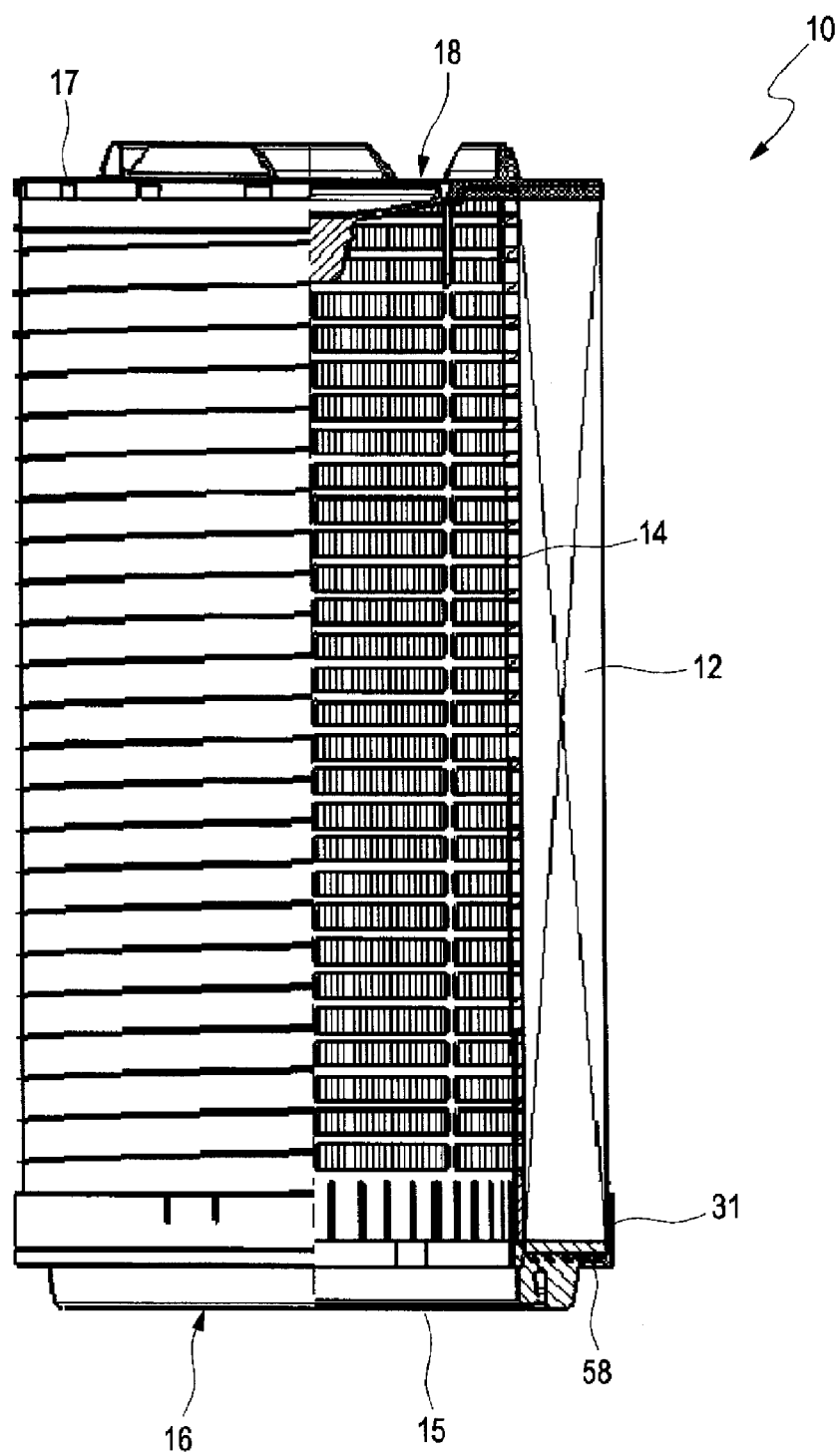
FIG. 4 shows a filter element according to the prior art with a closed reinforcement ring and integrated end plates.

FIG. 4 shows a filter element 10 according to the prior art with a closed reinforcement ring 31 and integrated end plates 16, 18. The filter element 10 is provided at both end faces 15 and 17 with end plates 16 and 18 that close off the filter element 10 at the two end faces 15, 17. The right half of the filter element 10 is cut open so that the filter body 12 as well as the support tube 14 can be seen. At the end face 58 of the filter body 12, the reinforcement ring 31 can be seen which extends and engages with a closed rim about the outer edge of the filter body 12. The end plate 16 is foamed to this end face 58 of the filter body 12 and seals it together with the reinforcement ring 31.

Figure 5:
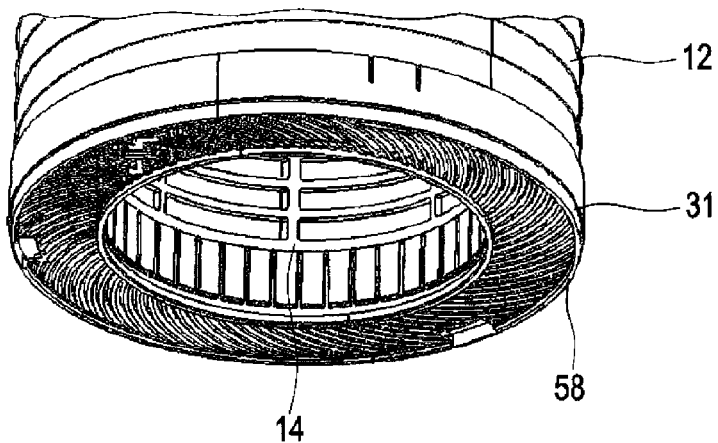
FIG. 5 shows a perspective illustration of the filter body with closed reinforcement ring in accordance with the prior art.

In FIG. 5 in a perspective illustration a filter body 12 with a closed reinforcement ring 31 according to the prior art is illustrated. The cylinder-shaped filter body 12 is closed at the end face 58 with the reinforcement ring 31 that has a closed rim. A support tube 14 for reinforcing the filter body 12 is provided on the inner side of the filter body 12.

Figure 6:
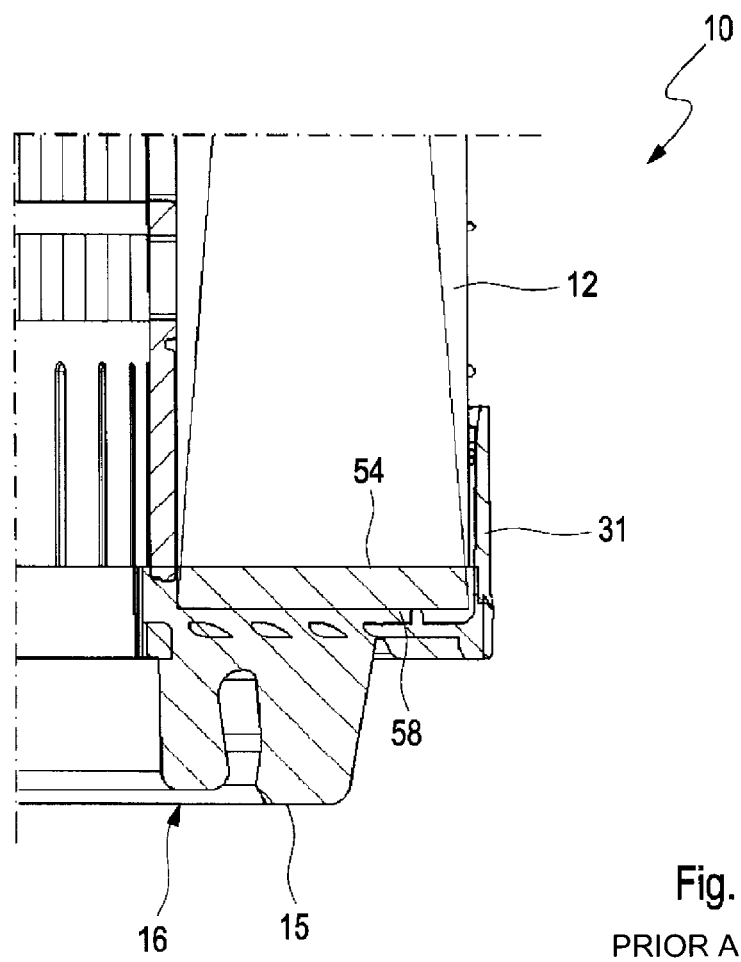
FIG. 6 shows a partial longitudinal section of the filter element according to the prior art with closed reinforcement ring and an integrated end plate.

FIG. 6 shows a partial longitudinal section view of a filter element 10 according to the prior art with a filter body 12 with closed reinforcement ring 31 and integrated end plate 16, as illustrated in FIG. 5. An end plate 16 that is foamed onto the filter body 12 and the reinforcement ring 31 is shown. In the inner space of the filter body 12, a filling level 54 of the material of the end plate 16 can be seen; the filling level 54 however cannot be observed form the exterior because of the closed upwardly extending rim of the reinforcement ring 31 and therefore can neither be checked during the manufacturing process nor thereafter. The filling level 54 can be determined only by cutting open the reinforcement ring 31, i.e., by a destructive testing measure.

Figure 7:
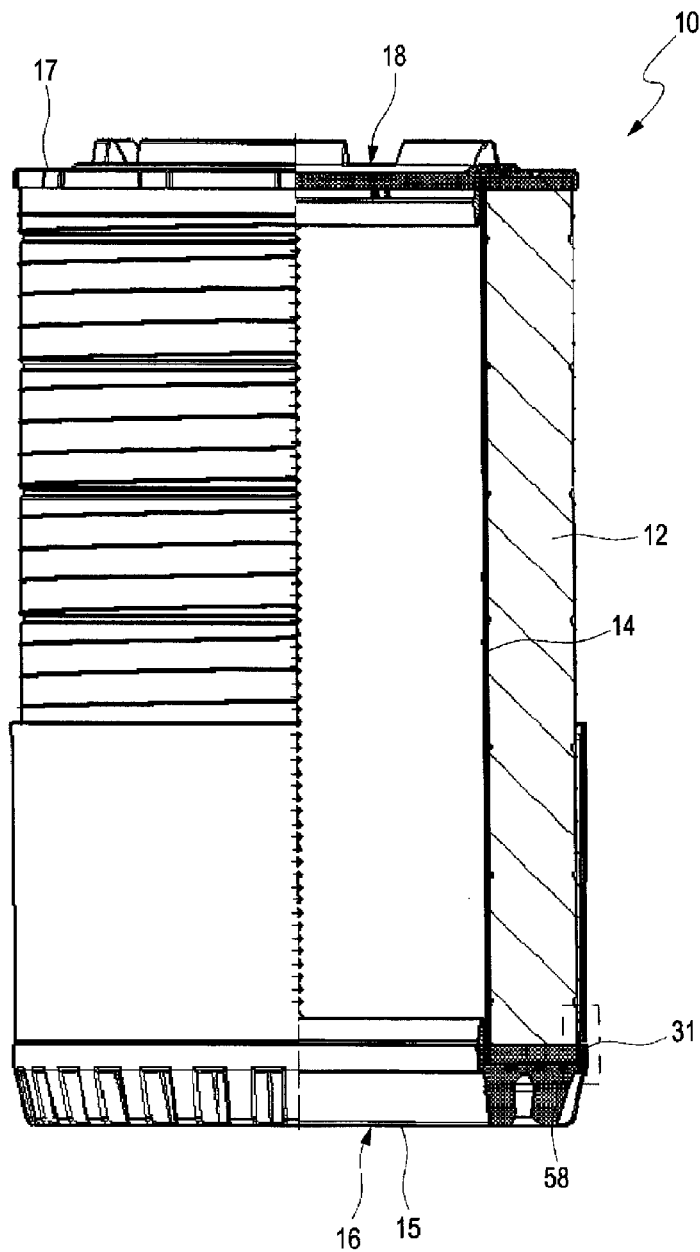
FIG. 7 shows a filter element according to one embodiment of the invention with a slotted reinforcement ring and integrated end plates.

In contrast to the prior art embodiment, in FIG. 7 a filter element 10 according to an embodiment of the invention with slotted reinforcement ring 31 and integrated end plates 16, 18 is illustrated. At both end faces 15 and 17, the filter element 10 is provided with end plates 16 and 18 that close off the filter element 10 at both end faces 15, 17. The right half of the filter element 10 is cut away so that the filter body 12 as well as the support tube 14 can be seen. At the end face 58 of the filter body 12, the reinforcement ring 31 can be seen which extends and engages with a slotted rim across the outer edge of the filter body 12. The end plate 16 is foamed to the end face 58 of the filter body 12 and seals the end face 58 together with the reinforcement ring 31.

Figure 8:
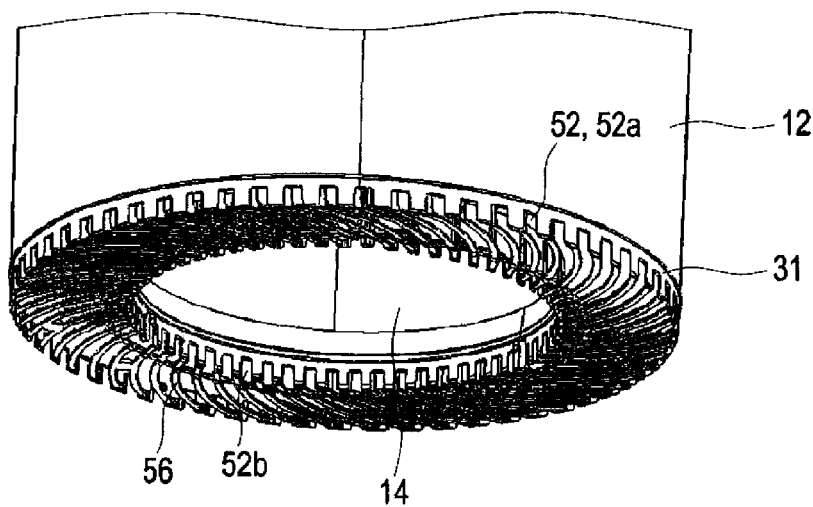
FIG. 8 is a perspective illustration of the filter body with the slotted reinforcement ring according to one embodiment of the invention.

FIG. 8 shows a perspective illustration of the filter body 12 with slotted reinforcement ring 31 according to the embodiment of the invention. The reinforcement ring 31 has openings 52 that are visible from the exterior and are formed as slots 52a. Due to the curved webs 56 which extend across the entire depth of the reinforcement ring 31 to the inner side, there are also openings 52b realized that are visible from the inner side. The inner side of the reinforcement ring 31 adjoins the support tube 14. Openings 52b that are visible from the inner side can be realized also by other configurations, i.e., other structures than the curved webs 56.

Figure 9:
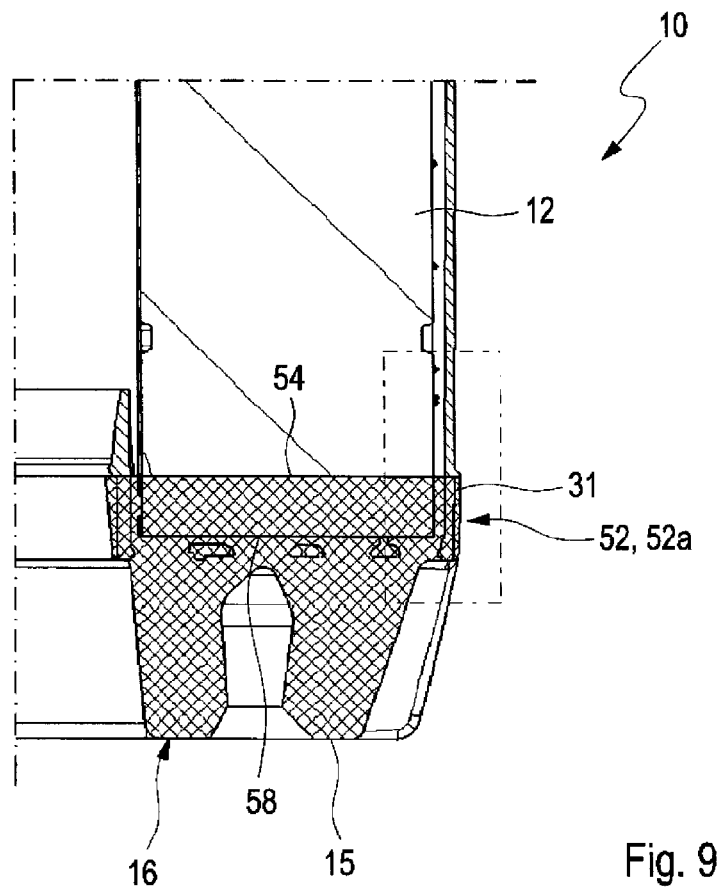
FIG. 9 is a partial longitudinal section view of the filter element according to an embodiment of the invention with a slotted reinforcement ring and integrated end plate.

FIG. 9 shows a partial longitudinal section of the filter element 10 according to an embodiment of the invention with the filter body 12, as illustrated in FIG. 8, with a slotted reinforcement ring 31, and an integrated end disk 16 which is foamed onto the end face 58 of the filter body 12. The section illustration has been selected such that a slot 52a as opening 52 is cut so that at the outer side of the filter element 10 no wall of the reinforcement ring 31 can be seen. Through the slot 52a it is possible to determine from the exterior directly the filling level 54 of the foam of the end plate 16. A filling level check of the filling level of a material for connecting the plate 16 with the end face 58 of the filter body 12 by determining the rise of a foam via the openings 52 that are visible from the exterior can also be done directly online during the manufacturing process of the end plate. By means of inwardly positioned openings 52b, the filling level of the foam can also be checked from the inner side of the filter body 12. In the illustrated embodiment, the reinforcement ring 31 has curved webs 56 that improve interlocking of the material of the end plate 16 with the filter body 12 and thus provide a permanent sealing action of the end face 58 of the filter body 12.

While specific embodiments of the invention have been shown and described in detail to illustrate the inventive principles, it will be understood that the invention may be embodied otherwise without departing from such principles.

What is claimed is:

1. A filter element comprising:
   a filter body with a longitudinal axis, the filter body having a first axial end face and a second axial end face opposite the first end face;
   a first end plate arranged at the first end face and having an open or closed configuration;
   a second end plate arranged at the second end face;
   a support tube arranged concentrically to the longitudinal axis and extending between the first and second end plates;
   wherein the first end plate is reinforced by a reinforcement ring arranged on the first end face;
   wherein the reinforcement ring has first openings arranged on a radially exterior side of the filter body, the first openings extending through the reinforcement ring to the exterior side of the filter body, wherein the first openings are visible from a radial exterior of the reinforcement ring,
   wherein the reinforcement ring has second openings arranged on a radially interior side of the filter body, the second openings extending through the reinforcement ring to the radially interior side of the filter body, wherein the second openings are visible from a radial interior side of the reinforcement ring,
   wherein the first openings and second openings are adapted to allow a filling level check of a filling level of a material that connects the first end plate with the first end face at the radially exterior side and the radially interior side of the filter body.

2. The filter element according to claim 1, wherein the first openings of the reinforcement ring are slots.

3. The filter element according to claim 1, wherein the filling level check of the filling level of said material that connects the first end plate with the first end face is done by determining a rise of a foam of said material in the openings.

4. The filter element according to claim 1, wherein the first openings are adapted to allow determining a filling level of a material that forms the first end disk.

5. The filter element according to claim 1, wherein the reinforcement ring has curved webs for interlocking a material forming the first end plate with the filter body.

6. The filter element according to claim 1, wherein said material seals the first end face.

7. The filter element according to claim 1, wherein the first end plate has a radial seal that seals relative to a housing into which the filter element is inserted.

8. The filter element according to claim 1, wherein said material for connecting the at least one end plate with the end face of the filter body and a material of the first end plate are comprised of polyurethane foam or an elastomer.

9. The filter element according to claim 1, wherein the filter body is folded in a zigzag shape and is annularly closed,
   wherein the filter body is comprised of a filter medium selected from the group consisting of paper, paper reinforced with plastic fibers, and plastic-coated paper, and combinations thereof.

10. The filter element according to claim 1 wherein the filter element is a compact air filter.

11. The filter element according to claim 1 wherein the filter element is an air filter of an internal combustion engine.

12. The filter element according to claim 1 wherein the filter element is a particulate filter.

13. The filter element according to claim 1 wherein the filter element is a diesel particulate filter of an internal combustion engine.

14. The filter element according to claim 1, wherein the reinforcement ring includes a plurality of though opening slots extending across the end face of the filter body from the radially exterior side of the filter body to the radially interior side of the filter body;
   wherein the plurality of though opening slots extending across the end face of the filter body, continue axially inwardly on the radially interior side of the filter body and on the radially exterior side of the filter body.

15. A filter system comprising a filter element according to claim 1, the filter system comprising a housing substantially configured concentrically about a longitudinal axis of the housing;

a cover closing off the housing and configured concentrically about the longitudinal axis;

an inlet supplying a medium to be filtered to the housing, the inlet arranged at the housing and/or at the cover;

an outlet discharging the medium from the housing after filtration, the outlet arranged on the housing concentric to the longitudinal axis;

wherein on the housing in the area of the outlet a sealing contour is provided which corresponds with a radial seal of the first end plate of the filter element;

wherein the filter element is arranged exchangeably in the housing.

16. The filter system according to claim 15, further comprising a cyclone separator arranged at the inlet and further comprising a dirt outlet arranged on the housing or on the cover.

17. The filter system according to claim 15, further comprising a secondary element arranged in an inner space of the filter element.

18. The filter system according to claim 17, wherein the secondary element is connected with the housing and remains in the housing when the filter element is exchanged.

\* \* \* \* \*